(12) United States Patent
Witherspoon

(10) Patent No.: US 6,361,004 B1
(45) Date of Patent: Mar. 26, 2002

(54) DEVICE FOR HOLDING A LID ABOVE A CONTAINER

(76) Inventor: Anthony L. Witherspoon, P.O. Box 412, Dickson, TN (US) 37055

( * ) Notice: Subject to any disclaimer, the term of this patent is extended or adjusted under 35 U.S.C. 154(b) by 0 days.

(21) Appl. No.: 09/506,549

(22) Filed: Feb. 18, 2000

(51) Int. Cl.[7] .......................... A47B 96/06; F16M 11/00
(52) U.S. Cl. .............................. 248/213.2; 248/231.71; 248/529
(58) Field of Search ................................. 248/156, 165, 248/213.2, 227.1, 227.4, 529, 530, 533, 230.5, 230.21, 304, 558, 126, 316.4, 316.6, 229.12, 229.14, 231.41, 231.61, 230.3, 312.1, 313, 210, 211, 231.71, 230.6, 229.15, 229.25

(56) References Cited

U.S. PATENT DOCUMENTS

| | | | |
|---|---|---|---|
| 2,430,161 A | * 11/1947 | Csencsics | 248/229.15 |
| 2,607,881 A | * 8/1952 | Anderson | 240/4.2 |
| 2,975,999 A | 3/1961 | Bunch | |
| 3,178,144 A | * 4/1965 | Kimoto | 248/229 |
| 3,995,796 A | 12/1976 | Kline | |
| 4,025,206 A | 5/1977 | Rubin | |
| 4,049,959 A | * 9/1977 | Ledterman | 240/7.55 |
| 4,065,085 A | * 12/1977 | Gellatly | 248/124 |
| 4,078,756 A | * 3/1978 | Cross | 248/226.4 |
| 4,625,937 A | 12/1986 | Haase | |
| D290,659 S | 6/1987 | Patey | |
| 4,709,890 A | 12/1987 | Moore | |
| 4,721,225 A | 1/1988 | Sobel | |
| 4,890,353 A | 1/1990 | Shannon et al. | |
| 4,941,633 A | * 7/1990 | Walker et al. | 248/228 |
| D313,296 S | 12/1990 | Abbey | |
| 5,035,386 A | 7/1991 | Tucker | |
| 5,108,058 A | * 4/1992 | White | 248/126 |
| 5,323,991 A | * 6/1994 | West | 248/121 |
| 5,390,888 A | 2/1995 | Rogers | |
| 5,683,010 A | 11/1997 | Boyajian, Jr. | |
| 6,015,122 A | * 1/2000 | Qui | 248/156 |

* cited by examiner

Primary Examiner—Anita King
Assistant Examiner—Jon A Szummy

(57) ABSTRACT

A device for holding a lid above a container for holding a lid above a smoker, a grill or other like device. The device for holding a lid above a container includes a mounting assembly and a suspending arm assembly. The mounting assembly has a first bracket for attaching to the top edge of the base of the container. A second bracket is integrally coupled to a top side of the base portion of the first bracket. The suspending arm assembly has a first arm segment for holding the lid. The first arm segment has a first end and a second end. The first arm segment has a bend therein. The first arm segment has a hook thereon positioned generally adjacent to the first end. A second arm segment has a first end and a second end. A portion of the second bracket is removably insertable in the first end of the second arm segment. A coupling means couples the first arm segment to the second arm segment.

9 Claims, 3 Drawing Sheets

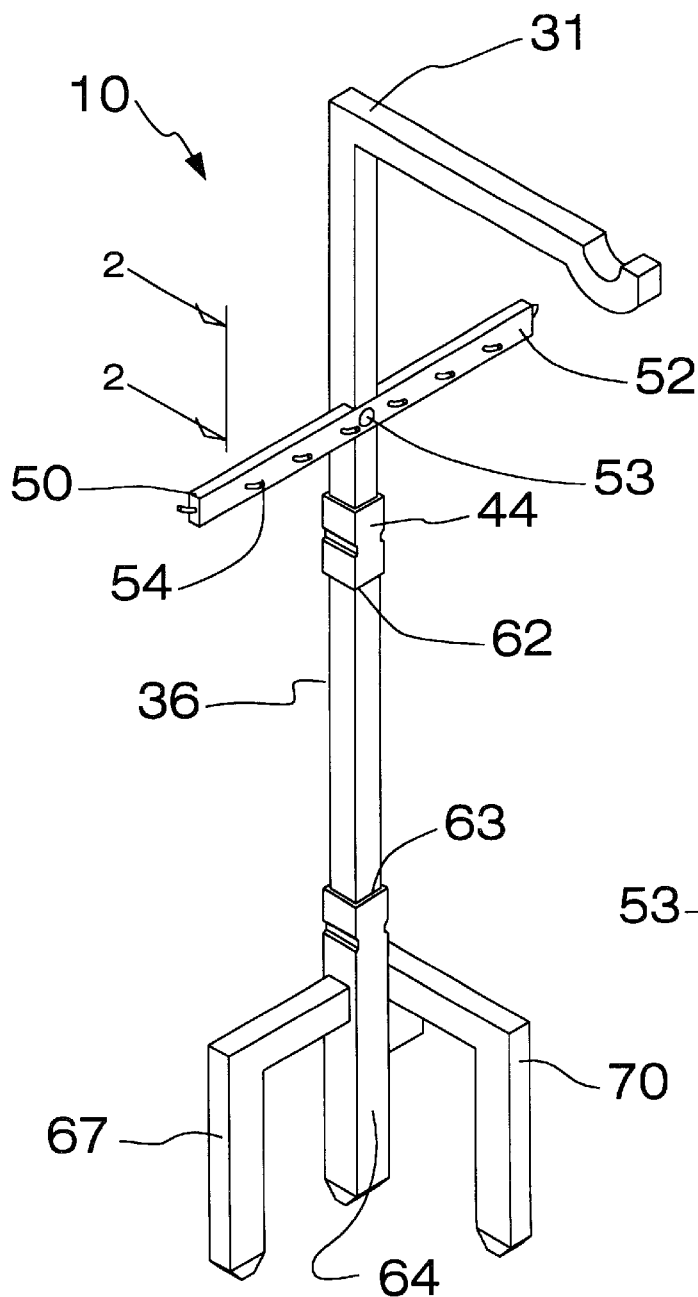
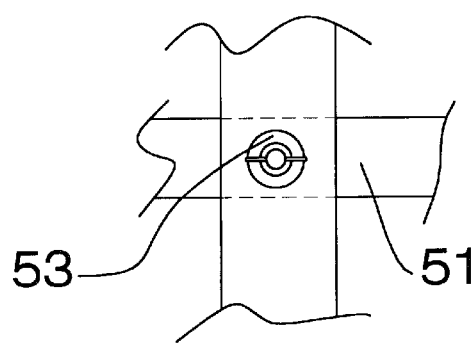

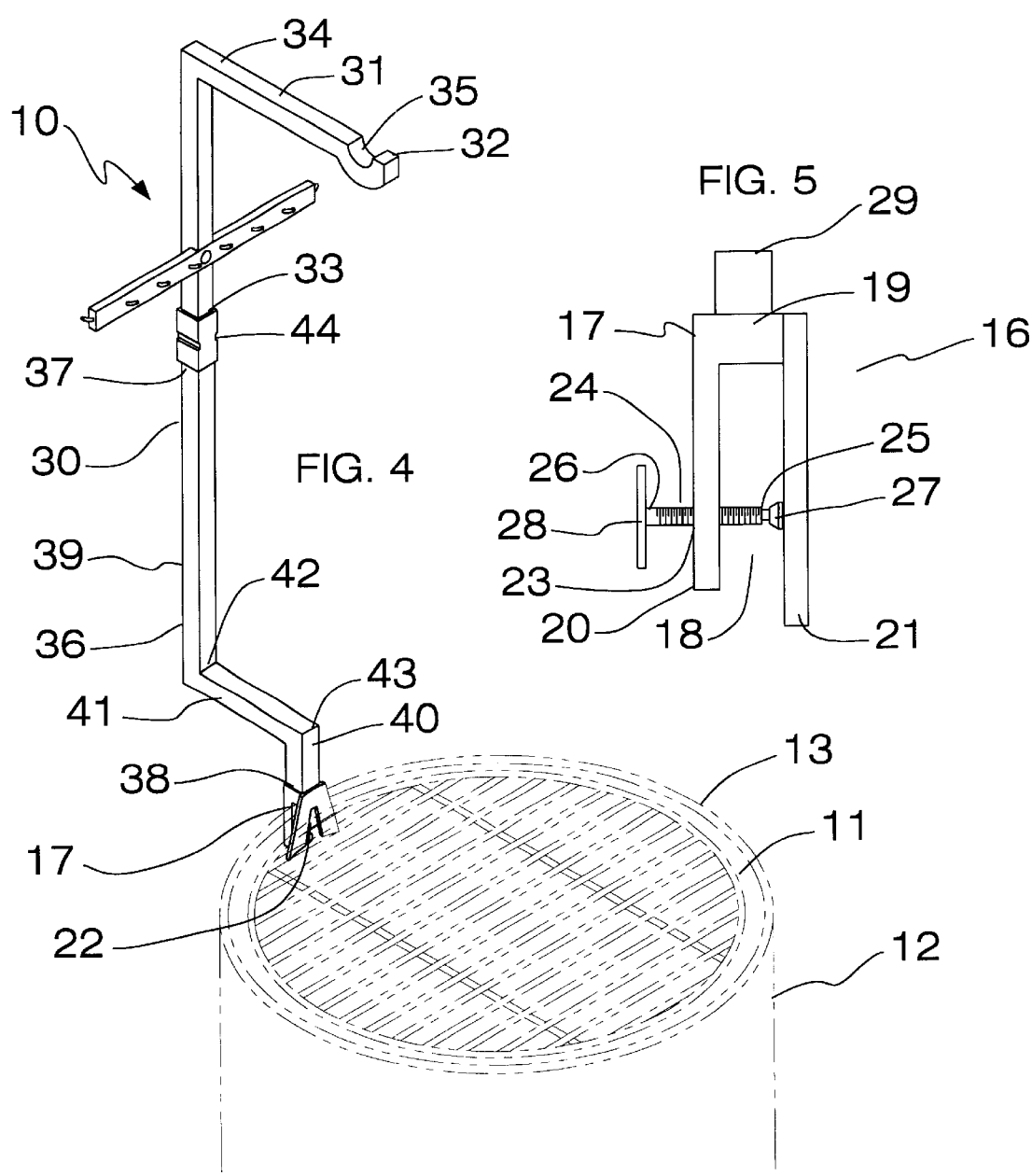

DEVICE FOR HOLDING A LID ABOVE A CONTAINER

BACKGROUND OF THE INVENTION

1. Field of the Invention

The present invention relates to lid holders and more particularly pertains to a new device for holding a lid above a container for holding a lid above a smoker, a grill or other like device.

2. Description of the Prior Art

The use of lid holders is known in the prior art. More specifically, lid holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,683,010; 2,975,999; 3,995,796; 4,625,937; 4,709,890; and U.S. Pat. No. Des. 290,659.

While these devices fulfill their respective, particular objectives and requirements, the aforementioned patents do not disclose a new device for holding a lid above a container. The inventive device includes a mounting assembly and a suspending arm assembly. The mounting assembly has a first bracket for attaching to the top edge of the base of the container. A second bracket is integrally coupled to a top side of the first bracket. The suspending arm assembly has a first arm segment for holding the lid. The first arm segment has a first end and a second end. The first arm segment has a bend therein. The first arm segment has a hook thereon positioned generally adjacent to the first end. A second arm segment has a first end and a second end. A portion of the second bracket is removably insertable in the first end of the second arm segment. A coupling means couples the first arm segment to the second arm segment.

In these respects, the device for holding a lid above a container according to the present invention substantially departs from the conventional concepts and designs of the prior art, and in so doing provides an apparatus primarily developed for the purpose of holding a lid above a smoker, a grill or other like device.

SUMMARY OF THE INVENTION

In view of the foregoing disadvantages inherent in the known types of lid holders now present in the prior art, the present invention provides a new device for holding a lid above a container construction wherein the same can be utilized for holding a lid above a smoker, a grill or other like device.

The general purpose of the present invention, which will be described subsequently in greater detail, is to provide a new device for holding a lid above a container apparatus and method which has many of the advantages of the lid holders mentioned heretofore and many novel features that result in a new device for holding a lid above a container which is not anticipated, rendered obvious, suggested, or even implied by any of the prior art lid holders, either alone or in any combination thereof.

To attain this, the present invention generally comprises a mounting assembly and a suspending arm assembly. The mounting assembly has a first bracket for attaching to the top edge of the base of the container. A second bracket is integrally coupled to a top side of the base portion of the first bracket. The suspending arm assembly has a first arm segment for holding the lid. The first arm segment has a first end and a second end. The first arm segment has a bend therein. The first arm segment has a hook thereon positioned generally adjacent to the first end. A second arm segment has a first end and a second end. A portion of the second bracket is removably insertable in the first end of the second arm segment. A coupling means couples the first arm segment to the second arm segment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for holding a lid above a container apparatus and method which has many of the advantages of the lid holders mentioned heretofore and many novel features that result in a new device for holding a lid above a container which is not anticipated, rendered obvious, suggested, or even implied by any of the prior art lid holders, either alone or in any combination thereof.

It is another object of the present invention to provide a new device for holding a lid above a container which may be easily and efficiently manufactured and marketed.

It is a further object of the present invention to provide a new device for holding a lid above a container which is of a durable and reliable construction.

An even further object of the present invention is to provide a new device for holding a lid above a container which is susceptible of a low cost of manufacture with regard to both materials and labor, and which accordingly is then susceptible of low prices of sale to the consuming public, thereby making such device for holding a lid above a container economically available to the buying public.

Still yet another object of the present invention is to provide a new device for holding a lid above a container which provides in the apparatuses and methods of the prior art some of the advantages thereof, while simultaneously overcoming some of the disadvantages normally associated therewith.

Still another object of the present invention is to provide a new device for holding a lid above a container for holding a lid above a smoker, a grill or other like device.

Yet another object of the present invention is to provide a new device for holding a lid above a container which includes a mounting assembly and a suspending arm assembly. The mounting assembly has a first bracket for attaching to the top edge of the base of the container. A second bracket is integrally coupled to a top side of the base portion of the first bracket. The suspending arm assembly has a first arm segment for holding the lid. The first arm segment has a first end and a second end. The first arm segment has a bend therein. The first arm segment has a hook thereon positioned generally adjacent to the first end. A second arm segment has a first end and a second end. A portion of the second bracket is removably insertable in the first end of the second arm segment. A coupling means couples the first arm segment to the second arm segment.

Still yet another object of the present invention is to provide a new device for holding a lid above a container that can be mounted to any smoker or grill container having a lid which is not hingedly connected to the container.

Even still another object of the present invention is to provide a new device for holding a lid above a container that includes a bar having hooks thereon for holding cooking utensils.

Yes another object of the present invention is to provide a new device for holding a lid that can be readily mounted in the ground using a bracket assembly and anchor portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new device for holding a lid above a container according to the present invention.

FIG. 2 is a schematic back view of the bar of the present invention.

FIG. 4 is a schematic perspective view of the present invention.

FIG. 5 is a schematic side view of the first and second brackets of the present invention.

DESCRIPTION OF THE PREFERRED EMBODIMENT

Figure 3:
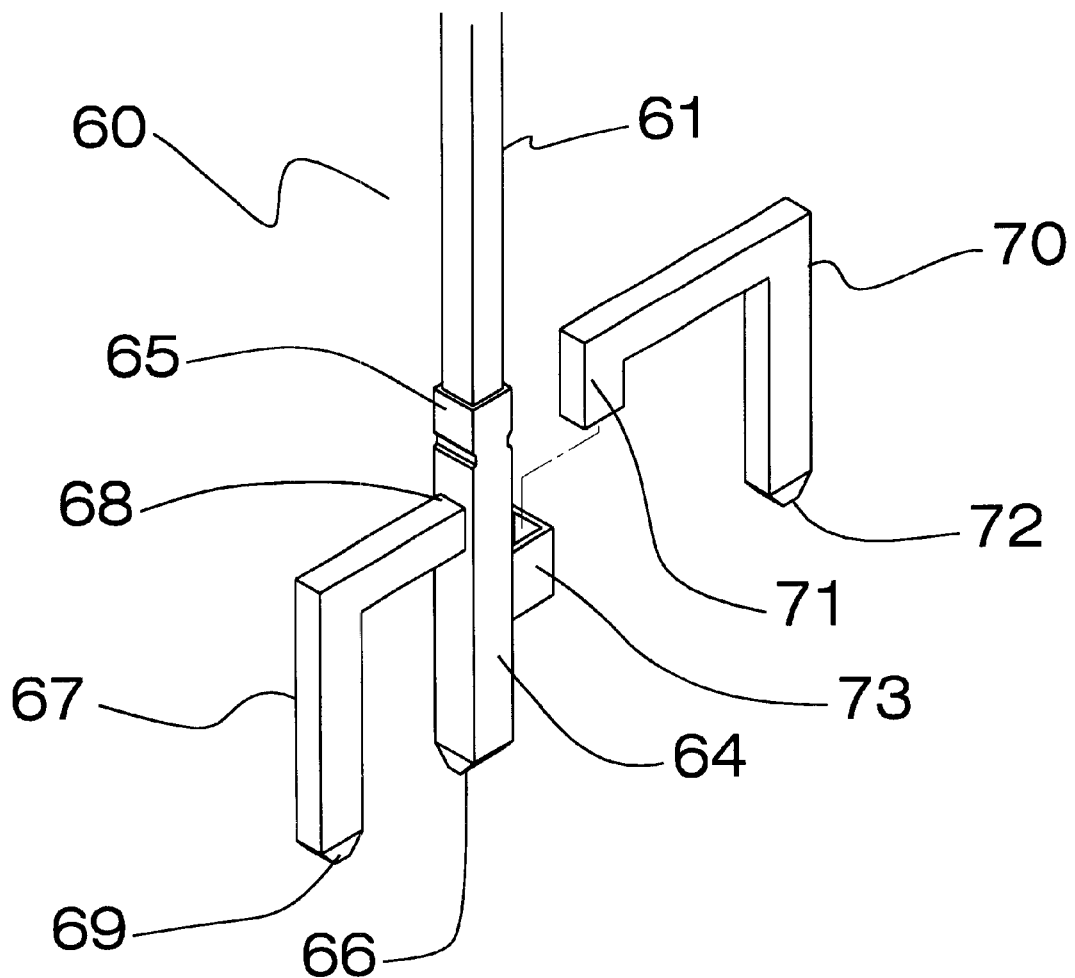
FIG. 3 is a schematic perspective view of the anchor portion of the present invention.

With reference now to the drawings, and in particular to FIGS. 1 through 5 thereof, a new device for holding a lid above a container embodying the principles and concepts of the present invention and generally designated by the reference numeral 10 will be described.

As best illustrated in FIGS. 1 through 5, the device 10 for holding a lid above a container 11 or in the ground generally comprises a mounting assembly 16 and a suspending arm assembly 30. The container 11 is preferably a grill or smoker apparatus having a top peripheral wall 12 and a top edge 13.

The mounting assembly 16 includes a first bracket 17 for attaching to the top edge 13 of the container 11. The first bracket 17 has a channel 18 for receiving the edge 13 of the container 11. The first bracket 17 has a U shaped configuration with a base portion 19, a first leg 20 and a second leg 21. The second leg 21 has a slot 22 therein.

A bore 23 is located in the first leg 20 of the first bracket 17.

A fastener 24, which is threaded, is removably insertable through the bore 23 in the first leg 20 such that the fastener 24 extends toward the slot 22 in the second leg 21. The fastener 24 is elongate and has a first end 25 and a second end 26. The second end 26 has a nub 27 thereon for abutting against the wall 12 of the container 11. The first end 24 has a handle portion 28 for turning the fastener 24. The fastener 24 preferably comprises a screw. Turning the fastener 24 in a first direction moves the nub 27 toward the slot 23 in the first bracket 17 for pinching a portion of a container 11 between the nub 27 and the second leg 21.

A second bracket 29 is integrally coupled to a top side of the base portion 19 of the first bracket 17. The second bracket 29 extends away from the base portion 19. The second bracket 29 comprises a block, which has a cavity, not shown, therein. The cavity extends downward toward the base portion 19. The cavity has a generally rectangular shape.

The suspending arm assembly 30 includes a first arm segment 31 for holding the lid. The first arm segment 31 has a first end 32 and a second end 33. The first arm segment 31 has a bend 34 therein. The bend 34 is positioned generally between the first 32 and second 33 ends such that the first arm segment 31 generally has an L-shape. A hook 35 is formed in a portion of the first arm segment 31 positioned generally adjacent to the first end 32. The hook 35 is directed in a direction opposite of the second end 33.

A second arm segment 36 has a first end 37 and a second end 38. A portion of the second bracket 29 is removably insertable in the second end 38 of the second arm segment 36. The second arm segment 36 has a distal portion 39 located adjacent to the first end 37, and a proximal portion 40 is located to the second end 38. A middle portion 41 extends between the proximal 40 and distal 39 portions. The second arm segment 36 has a first 42 and second bend 43 therein. The first bend 42 is positioned between the distal portion 39 and the middle portion 41. The second bend 43 is positioned between the proximal portion 40 and the middle portion 41. The middle portion 41 is orientated generally perpendicular to the distal 39 and proximal. 40 portions such that the first 37 and second 38 ends of the second arm segment 36 extend in generally opposite directions. The first 31 and second 36 arm segments generally have rectangular cross-sections.

A coupling means 44 couples the first arm segment 31 to the second arm segment 36. The coupling means 44 is a block having a top end and a bottom end. Each of the ends has a cavity, not shown, therein. Each of the cavities in the coupling means has a shape adapted for receiving one of the second ends 33, 38 of the first 31 and second 36 arm segments.

An elongate bar 50 has a back wall 51 and a front wall 52. The bar 50 is positioned in a slot in the first arm segment 31. The slot is positioned generally towards the second end 33 of the first arm segment 31 and faces in the general direction of the hook 35 and first end 32 of the first arm segment. A fastening means 53 extends through the bar 50 and into the first arm segment 31 such that the back wall 51 is abutted against the first arm segment 31. The front wall 52 has a plurality of protruding members 54 thereon.

A bracket assembly 60 mounts the first arm segment 31 in the ground. The bracket assembly 60 comprises elongate member 61. The elongate member 61 has a first end 62 and a second end 63. The first end 37 is removably insertable in the coupling means 44.

An anchoring portion of the bracket assembly 60 includes an upstanding member 64 having a first end 65 and a second end 66. The first end 65 has a cavity therein adapted for removably receiving the first end 62 of the elongate member 61. The second end 66 of the upstanding member 64 is pointed.

A first stabilizer 67 for stabilizing the upstanding member 64 is generally L-shaped and has a first 68 and second end 69. The first end 68 of the first stabilizer 67 is integrally coupled to the first upstanding member 64 such that the second end 69 of the first stabilizer 67 extends downward. The second end 69 of the first stabilizer 67 is pointed.

A second stabilizer 70 for stabilizing the upstanding member 64 is generally L-shaped and has a first 71 and second end 72. The first end 71 of the second stabilizer 70 is removably mountable to a bracket 73 on the upstanding member 64 such that the second end 72 of the second stabilizer 70 extends downward. The second end 72 of the second stabilizer 70 is pointed.

In use, the first bracket 17 is removably coupled to the edge 13 of the container 11. The second arm segment 36 has its second end 38 mounted on the second bracket 29. The first arm segment 31 is coupled to the second arm 36 via the coupling means 44. The first arm 31 has a hook 35 thereon adapted for holding the handle of the lid of the container 11. If the user does not want to mount the device 10 on the container 11, the bracket assembly 60 may be mounted in the ground. The pointed second ends 66, 69 of the upstanding member 64 and first stabilizer 67 are pressed into the ground. For additional support, the second stabilizer 70 may be inserted in the bracket 73 on the side of the upstanding member 64 and the second end 72 of the second stabilizer 70 inserted into the ground. The elongate member 61 is inserted into the first end 65 of the upstanding member 64 and the coupling means 44 attaches the first arm segment 31 to the elongate member 61. The bar 50 may be used to hang cooking utensils or other items.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for holding a lid in a suspended condition above a container, said device comprising:
    a mounting assembly comprising:
        a first bracket for attaching to the top edge of the container;
        a second bracket, said second bracket being integrally coupled to a top side of a base portion of said first bracket;
    a suspending arm assembly comprising:
        a first arm segment for holding the lid, said first arm segment having a first end and a second end, said first arm segment having a bend therein, said first arm segment having a hook thereon positioned generally adjacent to said first end;
        a second arm segment having a first end and a second end, a portion of said second bracket being removably insertable in said second end of said second arm segment and
        a coupling means for coupling said first arm segment to said second arm segment;
    said first arm segment comprising:
        said bend in said first arm segment being positioned generally between said first and second ends such that said first arm segment generally has an L-shape, a portion of said first arm segment positioned generally adjacent to said first end forming said hook, said hook being directed in a direction opposite of said second end of said first arm segment; and
    said second arm segment comprising:
        said second arm having a distal portion being located adjacent to said first end, a proximal portion being located to said second end, and a middle portion, said second arm having a first and second bend therein, said first bend being positioned between said distal portion and said middle portion, said second bend being positioned between said proximal portion and said middle portion, wherein said middle portion is orientated generally perpendicular to said distal and proximal portions such that said first and second ends of said second arm segment extend in generally opposite directions.

2. The device for holding a lid in a suspended condition above a container as in claim 1, wherein said mounting assembly comprises:
    wherein said first bracket has a channel for receiving an edge of the container, said first bracket having a U shaped configuration with a base portion, a first leg and a second leg, said second leg having a slot therein;
    a bore, said bore being located in said first leg of said first bracket; and
    a fastener, said fastener being threaded, said fastener being removably insertable through said bore in said first leg such that said fastener extends toward said slot in said second leg.

3. The device for holding a lid in a suspended condition above a container as in claim 1, wherein said coupling means comprises:
    a block, said block having a top end and a bottom end, each of said ends having a cavity therein, each of said cavities in said coupling means having a shape adapted for receiving one of said second ends of said first and second arm segments.

4. The device for holding a lid in a suspended condition above a container as in claim 1, further comprising:
   a bar, said bar being elongate, said bar having a back wall and a front wall, said bar being positioned in a slot in said first arm segment, said slot being positioned generally towards said second end and facing said hook of said first arm segment, a fastening means extending through said bar and into said first arm segment such that said back wall is abutted against said first arm segment, said front wall having a plurality of protruding members thereon.

5. A device for holding a lid in a suspended condition above a container, said device comprising:
   a mounting assembly comprising a first bracket for attaching to the top edge of the container and a second bracket, said second bracket being integrally coupled to a top side of a base portion of said first bracket;
   a suspending arm assembly comprising:
      a first arm segment for holding the lid, said first arm segment having a first end and a second end, said first arm segment having a bend therein, said first arm segment having a hook thereon positioned generally adjacent to said first end;
      a second arm segment having a first end and a second end, a portion of said second bracket being removably insertable in said second end of said second arm segment;
      a coupling means for coupling said first arm segment to said second arm segment; and
      wherein said second arm segment has a distal portion being located adjacent to said first end, a proximal portion being located adjacent to said second end, and a middle portion, said second arm having a first and second bend therein, said first bend being positioned between said distal portion and said middle portion, said second bend being positioned between said proximal portion and said middle portion, wherein said middle portion is oriented generally perpendicular to said distal and proximal portions such that said first and second ends of said second arm segment extend in generally opposite directions.

6. The device for holding a lid in a suspended condition above container as in claim 5, wherein said first bracket has a channel for receiving an edge of the container, said first bracket having a U shaped configuration with a base portion, a first leg and a second leg, said second leg having a slot therein; and
   wherein said mounting assembly includes:
      a bore located in said first leg of said first bracket; and
      a threaded fastener removably insertable through said bore in said first leg such that said fastener extends toward said slot in said second leg.

7. The device for holding a lid in a suspended condition above a container as in claim 5, wherein said bend in said first arm segment is positioned generally between said first and second ends such that said first arm segment generally has an L-shape, a portion of said first arm segment positioned generally adjacent to said first end forming said hook, said hook being directed in a direction opposite of said second end of said first arm segment.

8. The device for holding a lid in a suspended condition above a container as in claim 5, further comprising an elongate bar having a back wall and a front wall, said bar being positioned in a slot in said first arm segment, said slot being positioned generally towards said second end and facing said hook of said first arm segment, a fastening means extending through said bar and into said first arm segment such that said back wall is abutted against said first arm segment, said front wall having a plurality of protruding members thereon.

9. The device for holding a lid in a suspended condition above a container as in claim 5, wherein said coupling means comprises a block having a top end and a bottom end, each of said ends having a cavity therein, each of said cavities in said coupling means having a shape adapted for receiving one of said second ends of said first and second arm segments.

* * * * *